(12) United States Patent
Ohnaka et al.

(10) Patent No.: US 11,506,787 B2
(45) Date of Patent: Nov. 22, 2022

(54) SENSOR DEVICE AND MEASUREMENT METHOD

(71) Applicant: OMRON Corporation, Kyoto (JP)

(72) Inventors: Shoichi Ohnaka, Kameoka (JP); Yusuke Iida, Ayabe (JP); Ryosuke Tsuzuki, Ayabe (JP); Koji Iguchi, Fukuchiyama (JP); Osamu Harada, Ayabe (JP)

(73) Assignee: OMRON Corporation, Kyoto (JP)

( * ) Notice: Subject to any disclaimer, the term of this patent is extended or adjusted under 35 U.S.C. 154(b) by 387 days.

(21) Appl. No.: 16/639,128

(22) PCT Filed: Jun. 28, 2018

(86) PCT No.: PCT/JP2018/024624
§ 371 (c)(1),
(2) Date: Feb. 14, 2020

(87) PCT Pub. No.: WO2019/049480
PCT Pub. Date: Mar. 14, 2019

(65) Prior Publication Data
US 2020/0209395 A1    Jul. 2, 2020

(30) Foreign Application Priority Data

Sep. 8, 2017   (JP) .............................. JP2017-172879

(51) Int. Cl.
*G01S 17/42*       (2006.01)
*G01S 7/487*       (2006.01)
(Continued)

(52) U.S. Cl.
CPC .............. *G01S 17/42* (2013.01); *G01S 7/487* (2013.01); *G01S 17/08* (2013.01); *G01S 17/50* (2013.01)

(58) Field of Classification Search
CPC .................................... G01J 1/46; G01P 3/64
See application file for complete search history.

(56) References Cited

U.S. PATENT DOCUMENTS 4,135,155 A * 1/1979 Kehl .................... G01P 3/64
                                                377/9
9,354,352 B2 * 5/2016 Baba ..................... G01J 1/46
(Continued)

FOREIGN PATENT DOCUMENTS

EP        1901092      3/2008
JP       2000121726    4/2000
(Continued)

OTHER PUBLICATIONS

"International Search Report (Form PCT/ISA/210) of PCT/JP2018/024624," dated Sep. 4, 2018, with English translation thereof, pp. 1-6.
(Continued)

*Primary Examiner* — Bernarr E Gregory
(74) *Attorney, Agent, or Firm* — JCIPRNET

(57) ABSTRACT

A sensor device measuring a distance to an object includes: a light projection unit repeatedly emitting detection light toward the object; a light reception unit receiving reflected light of the detection light and outputting a binarized light reception signal (RT); a light projection oscillation unit controlling the emission of the detection light and outputting a start signal synchronized with the emission of the detection light; a counter measurement unit starting counting of the RT when receiving the RT and the start signal, and outputting a stop signal corresponding to a feature point of the RT; a delay line measurement unit outputting a delay line output signal corresponding to the delay time of the RT near the feature point of the RT when receiving the RT and the stop
(Continued)

signal; and a distance calculation unit calculating the distance to the object based on the delay line output signal.

11 Claims, 11 Drawing Sheets

(51) Int. Cl.
*G01S 17/08* (2006.01)
*G01S 17/50* (2006.01)
*G01S 17/00* (2020.01)

(56) References Cited

U.S. PATENT DOCUMENTS

| 2002/0176067 | A1 | 11/2002 | Charbon |
| 2016/0365846 | A1 | 12/2016 | Wyland |

FOREIGN PATENT DOCUMENTS

| JP | 2000121746 | 4/2000 |
| JP | 2006317213 | 11/2006 |
| JP | 2009527158 | 7/2009 |
| JP | 2011191127 | 9/2011 |
| JP | 2015075453 | 4/2015 |
| JP | 2018152823 | 9/2018 |
| WO | 2018086943 | 5/2018 |

OTHER PUBLICATIONS

"Written Opinion of the International Searching Authority (Form PCT/ISA/237) of PCT/JP2018/024624," dated Sep. 4, 2018, with English translation thereof, pp. 1-8.
"Search Report of Europe Counterpart Application", dated Apr. 19, 2021, pp. 1-9.
"Office Action of Japan Counterpart Application", dated Nov. 17, 2020, with English translation thereof, p. 1-36.

* cited by examiner

SENSOR DEVICE AND MEASUREMENT METHOD

CROSS-REFERENCE TO RELATED APPLICATION

This application is a 371 application of the International PCT application serial no. PCT/JP2018/024624, filed on Jun. 28, 2018, which claims the priority benefit of Japan Patent Application No. 2017-172879, filed on Sep. 8, 2017. The entirety of each of the above—mentioned patent applications is hereby incorporated by reference herein and made a part of this specification.

BACKGROUND OF THE INVENTION

Technical Field

The present invention relates to a sensor device and a measurement method, and more particularly, to a sensor device and a measurement method for measuring a distance or a distance change to an object.

Related Art

A sensor device is known which emits light toward an object and receives reflected light thereof to determine presence or absence of the object and measure the distance from the object. A photoelectric sensor described in Patent Literature 1 (Japanese Patent Application Laid-Open No. 2015-75453) includes a light emission element that repeatedly generates detection light, a light reception element that receives reflected light of the detection light, a binarization processing unit that binarizes a light reception signal, a waveform detection unit that detects waveform data indicating a time change of the binarized light reception signal, a waveform integration unit that matches the light emission timings of the light emission elements to integrate two or more waveform data and generate integrated waveform data, and a workpiece discriminating unit that discriminates the presence or absence of a workpiece as an object on the basis of the integrated waveform data.

The waveform detection unit includes a waveform capturing unit including a plurality of storage elements, a light reception signal distribution unit that supplies binarized light reception signals to each storage element, and a capturing signal distribution unit that supplies capturing signals to each storage element. The light reception signal distribution unit is made up of a delay line formed by connecting a plurality of delay circuits in series, and the binarized light reception signal is input to an input end of the light reception signal distribution unit.

SUMMARY

The photoelectric sensor described in Patent Literature 1 requires a large number of delay circuits when it is intended to extend a distance range in which a distance to the object can be measured. Therefore, when the distance range is extended, a logical capacity of the light reception signal distribution unit increases accordingly. Further, when a large number of delay circuits are arranged, variations in measurement results due to temperature increase. If it is intended to improve the variations in the measurement results, the number of times of sampling of the light reception signals increases and the circuit scale increases.

An object of the present invention is to provide a sensor device and a measurement method capable of improving the measurement precision of the distance or the distance change to the object without increasing the circuit scale.

According to an aspect of the present disclosure, there is provided a sensor device which measures a distance or a distance change to an object, the sensor device including: a transmission unit which transmits a transmission signal toward the object; a reception unit which receives a received signal obtained by reflection of the transmission signal at the object and binarizes the received signal; a first integration unit which generates, on the basis of transmission timing of the transmission signal, a first waveform data obtained by sampling the received signal at a sampling cycle, and generates first integrated waveform data by integrating the first waveform data for multiple times of transmission by the transmission unit; a timing determination unit which determines reference timing on the basis of a position of a first feature point appearing in the first integrated waveform data due to presence of the object, and generates a stop signal on the basis of the reference timing, when the transmission unit transmits the transmission signal; at least one delay circuit unit which includes a plurality of delay elements connected in series, generates second waveform data by capturing the received signal from each of the delay elements in accordance with the generation of the stop signal, and generates second integrated waveform data by integrating the second waveform data by a predetermined clock cycle from the stop signal; and a distance calculation unit which calculates the distance to the object, on the basis of a position of a second feature point which appears in the second integrated waveform data due to the presence of the object and on the basis of timing at which the stop signal is generated.

Preferably, the sensor device further includes a second integration unit which integrates the second integrated waveform data output from each of the plurality of delay circuit units arranged in parallel, when there is a plurality of delay circuit units.

Preferably, the first integration unit generates the first integrated waveform data by integrating the first waveform data for a first number of times, the timing determination unit generates the stop signal on the basis of the reference timing for each of the first number of times, and the delay circuit unit generates the second integrated waveform data by integrating the second waveform data for a second number of times.

Preferably, in a case that the first number of times and the second number of times are the same, the efficiency of measurement is higher than in a case that the first number of times and the second number of times are different from each other.

Preferably, the delay circuit unit includes a temperature correction unit including a plurality of delay elements connected in series, the temperature correction unit calculates a delay width at the current temperature, on the basis of the delay width of the delay elements in a reference clock time, and the distance calculation unit corrects the distance to the object on the basis of the delay width at the current temperature.

Preferably, the first feature point is a rising time point of the first integrated waveform data which first intersects a first threshold value, and the first integration unit determines the first feature point by searching an intersection between the first integrated waveform data and the first threshold value from past to future or from future to past at the sampling cycle.

Preferably, the first threshold value is set to ½ of the number of times of integration of the first waveform data, and is changed from ½, depending on the distance between the object and the sensor device or the reflectivity of the object.

Preferably, the second feature point is an intersection between the second integrated waveform data and a second threshold value, and the delay circuit unit searches the second integrated waveform data from the second feature point toward the past or the future.

Preferably, the distance calculation unit performs filter processing on the second integrated waveform data by a simple moving average or a weighted moving average, before calculating the distance to the object.

Preferably, the first integration unit has a resolution on the nanosecond order, and the delay circuit unit has a resolution on the picosecond order.

According to another aspect of the present disclosure, there is provided a measurement method for measuring a distance or a distance change to an object, the method including: a step of transmitting a transmission signal toward the object; a step of receiving a received signal obtained by reflection of the transmission signal at the object and binarizing the received signal; a step of generating, on the basis of transmission timing of the transmission signal, a first waveform data obtained by sampling the received signal at a sampling cycle, and generating first integrated waveform data by integrating the first waveform data for multiple times of transmission; a step of determining reference timing on the basis of a position of a first feature point which appears in the first integrated waveform data due to presence of the object, and generating a stop signal based on the reference timing, when the transmission signal is transmitted; a step of generating second waveform data by capturing the received signal from each of a plurality of delay elements connected in series in accordance with the generation of the stop signal, and generating second integrated waveform data by integrating the second waveform data by a predetermined clock cycle from the stop signal; and a step of calculating the distance to the object on the basis of a position of a second feature point which appears in the second integrated waveform data due to the presence of the object and on the basis of timing at which the stop signal is generated.

According to the present invention, it is possible to improve the measurement precision of the distance or the distance change to the object without increasing the circuit scale.

DESCRIPTION OF THE EMBODIMENTS

Figure 1:
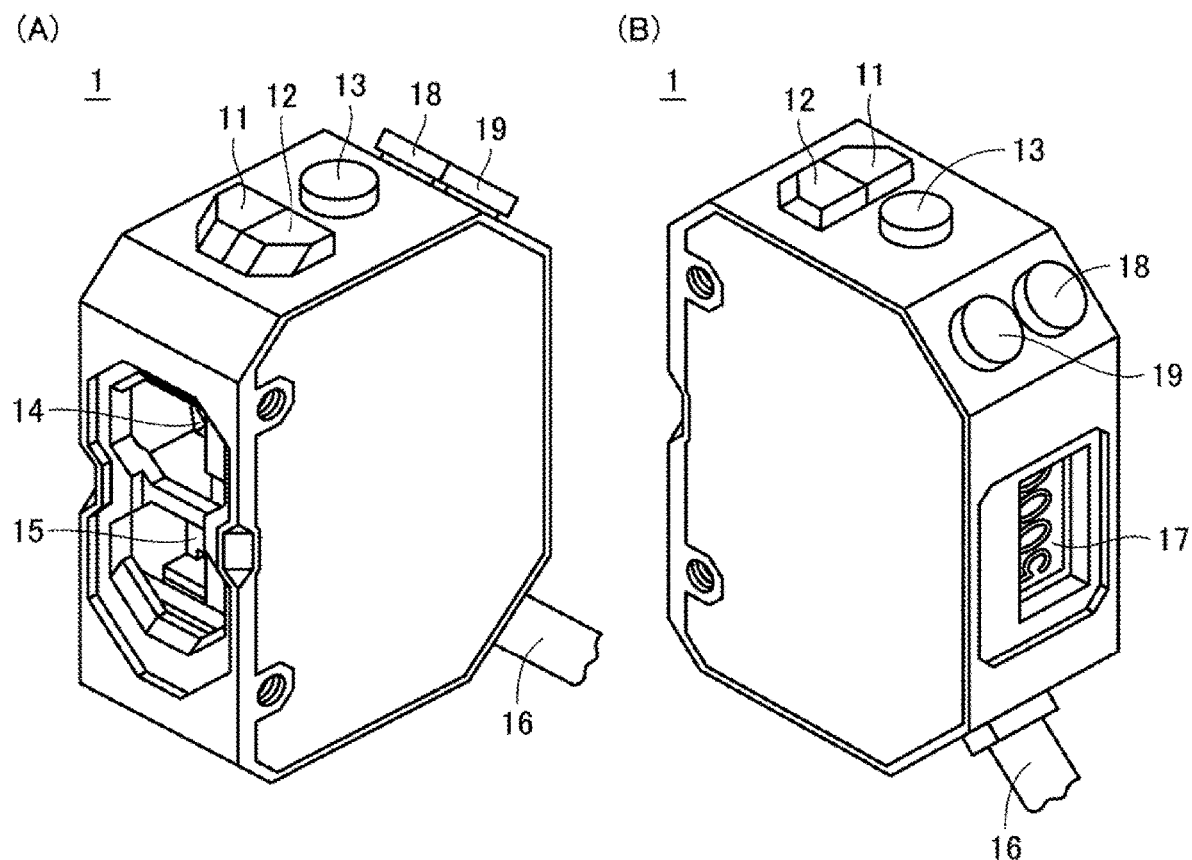
FIG. 1 is a schematic view showing an external appearance of a sensor device 1 according to an embodiment of the present invention.

Embodiments of the present invention are described in detail with reference to the drawings. In addition, the same or equivalent parts in the drawings are denoted by the same reference numerals, and the description thereof will not be repeated.

FIG. 1 is a schematic view showing an external appearance of a sensor device 1 according to an embodiment of the present invention.

(A) of FIG. 1 is a perspective view of the sensor device 1 as viewed from an upper left side, and (B) of FIG. 1 is a perspective view of the sensor device 1 as viewed from an upper right side. Referring to FIG. 1, the sensor device 1 includes an operation indicator lamp 11 indicating that the sensor device 1 is in an output state, a stability indicator lamp 12 indicating that the sensor device 1 is in a stable state, an operation button 13 which executes teaching to the sensor device 1, a light projection element 14 which projects detection light to a workpiece as an object, a light reception element 15 which receives reflected light of the detection light, a cable 16 connected to another device (not shown) and used for power supply, input/output, communication, and the like, a display unit 17 for performing a display output, and input buttons 18 and 19 which operate numerical values to be displayed on the display unit 17. The sensor device 1 is, for example, a photoelectric sensor. For example, an organic EL (Electro Luminescence) is used as the display unit 17.

Figure 2:
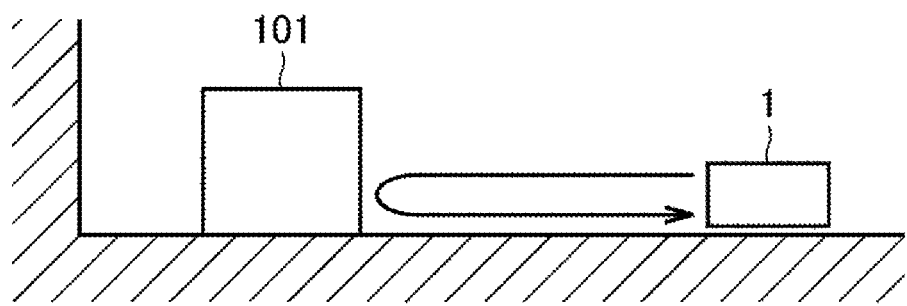
FIG. 2 is a schematic view showing an example in which the sensor device 1 according to the embodiment of the present invention detects a workpiece 101.

FIG. 2 is a schematic view showing an example in which the sensor device 1 according to the embodiment of the present invention detects a workpiece 101.

Referring to FIG. 2, the sensor device 1 projects detection light toward the workpiece 101. The detection light reflected by the workpiece 101 is received again by the sensor device 1. The sensor device 1 can precisely measure a distance to the workpiece 101 by performing signal processing on the received detection light in the sensor device 1. In addition to the schematic view, for example, a mode in which the workpiece flowing on a factory line is measured from above is also considered. In addition to light, electromagnetic waves and sound waves are also considered to be output from the sensor device 1 to the workpiece 101.

Figure 3:
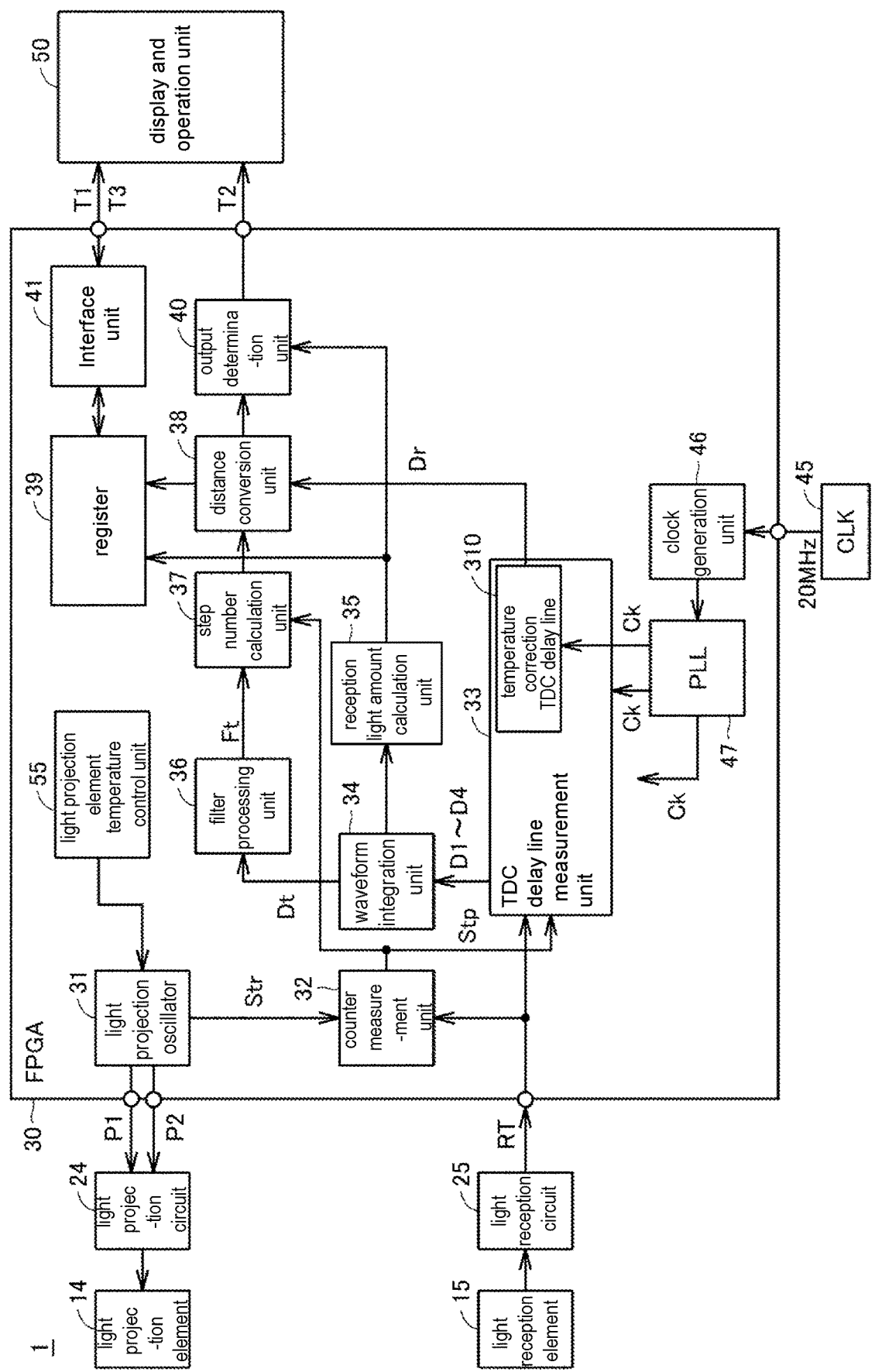
FIG. 3 is a functional block diagram showing a circuit configuration of the sensor device 1 according to the embodiment of the present invention.

FIG. 3 is a functional block diagram showing a circuit configuration of the sensor device 1 according to the embodiment of the present invention.

Referring to FIG. 3, the sensor device 1 includes a light projection element 14, a light reception element 15, a light projection circuit 24, a light reception circuit 25, a FPGA (Field-Programmable Gate Array) 30, a CLK 45, a display and operation unit 50, and a light projection element temperature control unit 55. The FPGA 30 includes a light projection oscillator 31, a counter measurement unit 32, a TDC (Time-to-Digital Converter) delay line measurement unit 33, a waveform integration unit 34, a reception light amount calculation unit 35, a filter processing unit 36, a step number calculation processing unit 37, a distance conversion unit 38, a register 39, an output determination unit 40, an interface unit 41, a clock generation unit 46, and a PLL (Phase Locked Loop) 47. The FPGA 30 can also be replaced with an integrated circuit such as an ASIC (Application Specific Integrated Circuit). The TDC delay line measurement unit 33 includes a temperature correction TDC delay line 310.

The light projection element 14 repeatedly emits detection light toward the workpiece 101 (see FIG. 2). Although a case where the detection light is periodically emitted is described below, there is also a case where the detection light is emitted randomly. The light projection element 14 is, for example, a LD (Laser Diode). The detection light is, for example, pulsed light. The light projection circuit 24 receives a pulse control signal P1 and a power control signal P2 of the light projection element 14 from the light projection oscillator 31, and controls the detection light emitted from the light projection element 14. The light reception element 15 receives the detection light reflected from the workpiece 101. The light reception element 15 is, for example, an APD (Avalanche Photo Diode). The light reception circuit 25 outputs a light reception signal RT from the light reception element 15 to the FPGA 30. The light reception signal RT is binarized by the light reception circuit 25.

The CLK 45 sends, for example, an oscillation signal of 20 MHz to the clock generation unit 46. The clock generation unit 46 receives the oscillation signal and outputs a reference clock. The PLL 47 receives the reference clock and outputs a clock signal Ck phase-synchronized with a desired frequency. The clock signal Ck is output to each block of the FPGA 30.

The light projection oscillator 31 receives the output signal from the light projection element temperature control unit 55, and outputs the pulse control signal P1 and the power control signal P2 to the light projection circuit 24. The light projection element temperature control unit 55 controls the light projection power based on the temperature information of the light projection element 14. In addition, the projection oscillator 31 outputs a start signal Str, which starts the counter in the counter measurement unit 32, to the counter measurement unit 32 in synchronization with the pulse control signal P1. The counter measurement unit 32 receives the light reception signal RT and the start signal Str, starts counting of the light reception signal RT, and outputs a stop signal Stp corresponding to the feature point of the light reception signal RT to the TDC delay line measurement unit 33.

The TDC delay line measurement unit 33 receives the light reception signal RT and the stop signal Stp, and outputs delay line output signals D1 to D4 to the waveform integration unit 34. The TDC delay line measurement unit 33 is different from a TDC that measures the time of a stop pulse that arrives after the start pulse, that is, a single hit type TDC that uses a delay line.

The temperature correction TDC delay line 310 receives the reference signal from the PLL 47 and outputs a temperature correction delay line output signal Dr to the distance conversion unit 38. The waveform integration unit 34 outputs an integration signal Dt obtained by integrating the delay line output signals D1 to D4 to the filter processing unit 36. The reception light amount calculation unit 35 receives the integration result of the waveform integration unit 34 and calculates the reception light amount of the light reception element 15.

The filter processing unit 36 receives the integration signal Dt and outputs a filter output signal Ft obtained by performing filter-processing on the integration result to the step number calculation processing unit 37. The step number calculation processing unit 37 receives the filter output signal Ft, and calculates the number of steps of the delay circuit corresponding to the time from the start of the light projection to the light reception measurement point. The distance conversion unit 38 performs temperature correction on the calculated number of steps of the delay circuit with the temperature correction delay line output signal Dr, and then converts the number of steps into a distance to the workpiece 101 (see FIG. 2). The register 39 stores the output results of the reception light amount calculation unit 35 and the distance conversion unit 38, and the like. The output determination unit 40 outputs, to the display and operation unit 50, a determination signal T2 for determining whether the workpiece 101 exists on the basis of the output results of the reception light amount calculation unit 35 and the distance conversion unit 38.

The interface unit 41 outputs the output results of the reception light amount calculation unit 35 and the distance conversion unit 38 stored in the register 39 to the display and operation unit 50 as the measurement signal T1. The display and operation unit 50 includes the output indicator light 11, the stability indicator light 12, the operation button 13, the display unit 17, and the input buttons 18 and 19 shown in FIG. 1. The display and operation unit 50 receives the measurement signal T1 and outputs setting data T3, which is input from the operation button 13 and the input buttons 18 and 19, to the interface unit 41. The display and operation unit 50 includes a CPU (Central Processing Unit) that controls the sensor device 1.

Figure 4:
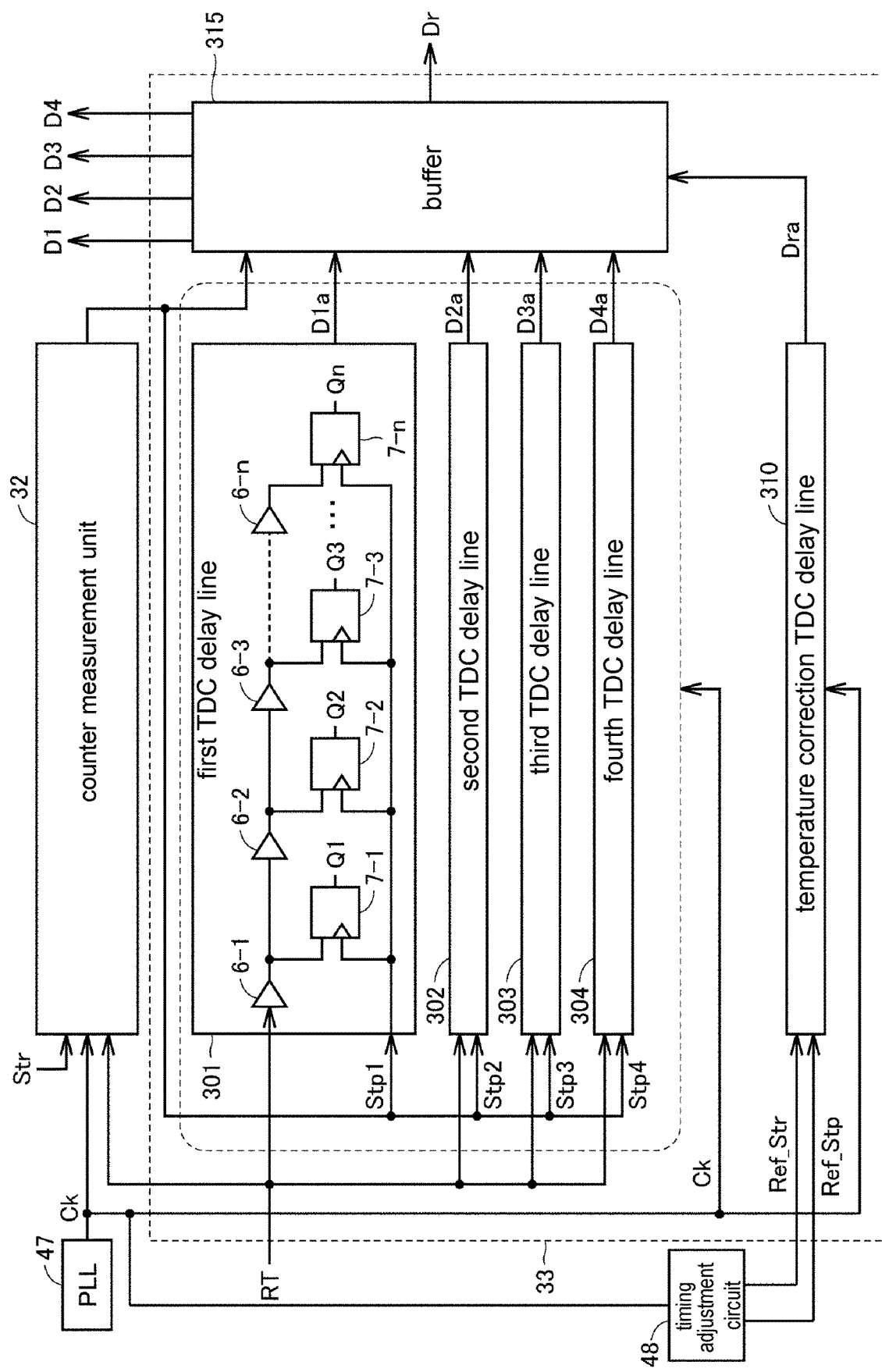
FIG. 4 is a block diagram showing a circuit configuration of a TDC delay line measurement unit 33 and its periphery according to the embodiment of the present invention.

FIG. 4 is a block diagram showing a circuit configuration of a TDC delay line measurement unit 33 and its periphery according to the embodiment of the present invention.

Referring to FIG. 4, the counter measurement unit 32 receives the light reception signal RT and the start signal Str, and starts counting of the light reception signal RT on the basis of the clock signal Ck output from the PLL 47. The counter measurement unit 32 outputs stop signals Stp1, Stp2, Stp3, and Stp4 (hereinafter also collectively referred to as "stop signal Stp"), which correspond to the feature points of the light reception signal RT, to the TDC delay line measurement unit 33.

The TDC delay line measurement unit 33 includes a first TDC delay line 301, a second TDC delay line 302, a third TDC delay line 303, a fourth TDC delay line 304, a temperature correction TDC delay line 310, and a buffer 315. Although four TDC delay lines are included in the TDC delay line measurement unit 33 in the embodiment of the present invention, the number of the TDC delay lines can be increased or decreased depending on the scale of the logical capacity. In addition, a temperature correction TDC delay line 310 for temperature correction is arranged separately from the measurement delay line. Accordingly, it is possible to correct the variations of the measurement results caused by temperature or voltage.

The first TDC delay line 301 includes delay elements 6-1, 6-2, 6-3, . . . , 6-n (n is a natural number, hereinafter also collectively referred to as "delay element 6"), and flip-flop circuits 7-1, 7-2, 7-3, . . . , 7-n (hereinafter also collectively referred to as "flip-flop circuit 7"). The delay element 6 is, for example, an inverter (NOT gate). The flip-flop circuit 7 is a D flip-flop, and can also be replaced by a latch circuit or the like. The delay circuit 6 according to the embodiment of the present invention performs the delay using carry-over by a carry for high-speed calculation of LE (Logic Element). As a result, the delay circuit 6 with high resolution on the picosecond order is realized in the FPGA 30. In addition, the delay circuit 6 in the FPGA 30 can also be realized by the use of a delay between the clock input and the Q input of the D flip-flop. In this case, a stable delay time on the nanosecond order can be obtained.

A delay element 6-1 receives the light reception signal RT and delays it for a fixed time, and then inputs it to the delay element 6-2 and the flip-flop circuit 7-1. The flip-flop circuit 7-1 outputs the input from the delay element 6-1 at the input timing of the stop signal Stp1. The delay element 6-2 receives the output of the delay element 6-1 and delays it for a fixed time, and then inputs it to the delay element 6-3 and the flip-flop circuit 7-2. The flip-flop circuit 7-2 outputs the input from the delay element 6-2 at the input timing of the stop signal Stp1. The same also applies to the delay element after the delay element 6-3 and the flip-flop circuit after the flip-flop circuit 7-3.

The first TDC delay line 301 combines delay signals Q1, Q2, Q3, . . . , Qn (hereinafter, referred to as "delay signals Q"), which are synchronously output from the flip-flop circuits 7-1, 7-2, 7-3, . . . , to output a delay line output signal D1a. The delay line output signal D1a becomes the waveform data of the light reception signal RT having a time length corresponding to the sum of the respective delay times of the delay elements 6-1, 6-2, 6-3, . . . .

After the delay line output signal D1a is output to the buffer 315, the first TDC delay line 301 is reset temporarily. Thereafter, the delay line output signal D1a (a=1 to m) is created again from the next light reception signal RT, and is accumulated in the buffer 315 until the predetermined number of times of integration (m times) is reached. The buffer 315 outputs a delay line output signal D1 obtained by integrating the delay line output signal D1a m times. The same also applies to the delay line output signals D2 to D4 of the TDC delay lines 302 to 304. The circuit configuration of the TDC delay lines 302 to 304 is the same as that of the TDC delay line 301. The TDC delay lines 301 to 304 are driven by the clock signal Ck from the PLL 47.

The temperature correction TDC delay line 310 receives a reference start signal Ref_Str and a reference stop signal Ref_Stp from the timing adjustment circuit 48, and outputs a temperature correction delay line output signal Dra (a=1 to m) independent of the light reception signal RT to the buffer 315. The buffer 315 outputs a temperature correction delay line output signal Dr obtained by integrating the temperature correction delay line output signal Dra m times. The circuit configuration of the temperature correction TDC delay line 310 is the same as that of the TDC delay line 301. The temperature correction TDC delay line 310 is driven by the clock signal Ck from the PLL 47.

The timing adjustment circuit 48 outputs the reference start signal Ref_Str and the reference stop signal Ref_Stp, which are created on the basis of the clock signal Ck from the PLL 47, to the temperature correction TDC delay line 310. The timing adjustment circuit 48 includes, for example, a differentiation circuit that detects a rising edge or a falling edge of the clock signal Ck, and a frequency division circuit that divides the frequency of the clock signal Ck.

A delay width of the delay element 6 included in the TDC delay lines 301 to 304 varies depending on the ambient temperature. Therefore, when the distance to the object is calculated from the delay width, the distance also varies depending on the temperature. The temperature correction TDC delay line 310 is configured for correcting such fluctuation in the number of delay steps caused by temperature.

Figure 5:
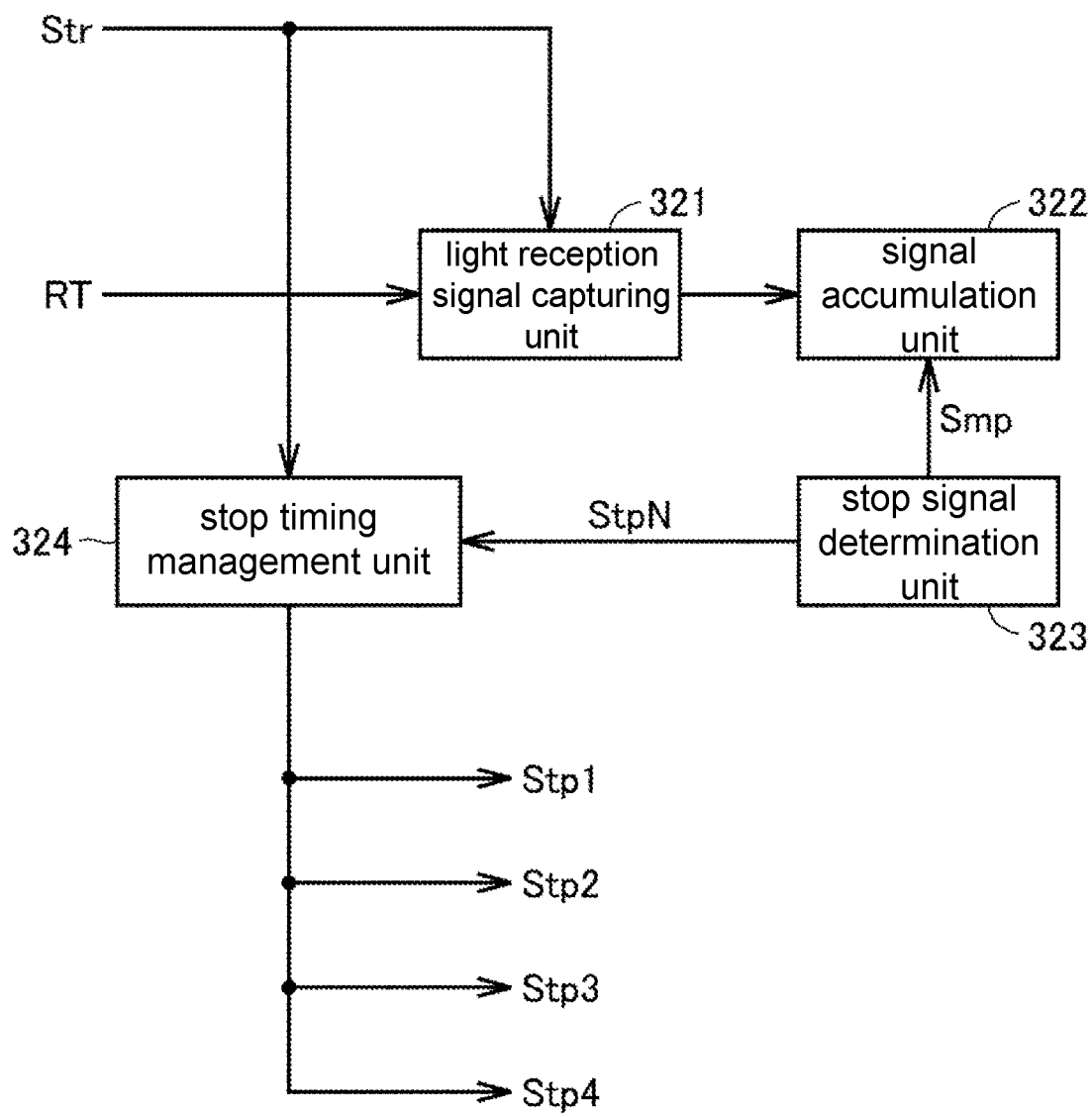
FIG. 5 is a block diagram showing an example of a specific configuration of a counter measurement unit 32 according to the embodiment of the present invention.

FIG. 5 is a block diagram showing an example of a specific configuration of the counter measurement unit 32 according to the embodiment of the present invention.

Referring to FIG. 5, the counter measurement unit 32 includes a light reception signal capturing unit 321, a signal accumulation unit 322, a stop signal determination unit 323, and a stop timing management unit 324. The light reception signal capturing unit 321 captures the binarized light reception signal RT on the basis of the timing of the start signal Str. The signal accumulation unit 322 accumulates the captured light reception signal RT. In the signal accumulation unit 322, measurement results for n measurement cycles are integrated in the rough measurement based on the clock. The stop signal determination unit 323 outputs a sampling signal Smp based on the clock signal to the accumulated light reception signal RT.

The stop signal determination unit 323 recognizes, as a measurement point, the rising time point of the integrated value of the light reception signal RT that first intersects a determination threshold value, and outputs the stop signal StpN at this time point. Moreover, the measurement point is not limited to the rising time point, and may be a falling time point or other feature points. The stop timing management unit 324 receives the stop signal StpN, and simultaneously outputs the stop signals Stp1, Stp2, Stp3, and Stp4 to the TDC delay lines 301 to 304 for every clock cycle 256 times on the basis of the timing of the start signal Str. The stop timing management unit 324 includes a register for correcting a time difference caused by a difference in wiring length which outputs the stop signals Stp1, Stp2, Stp3, and Stp4. By using the register, it is possible to suppress variation in the time measurement values caused by the wiring length.

Figure 6:
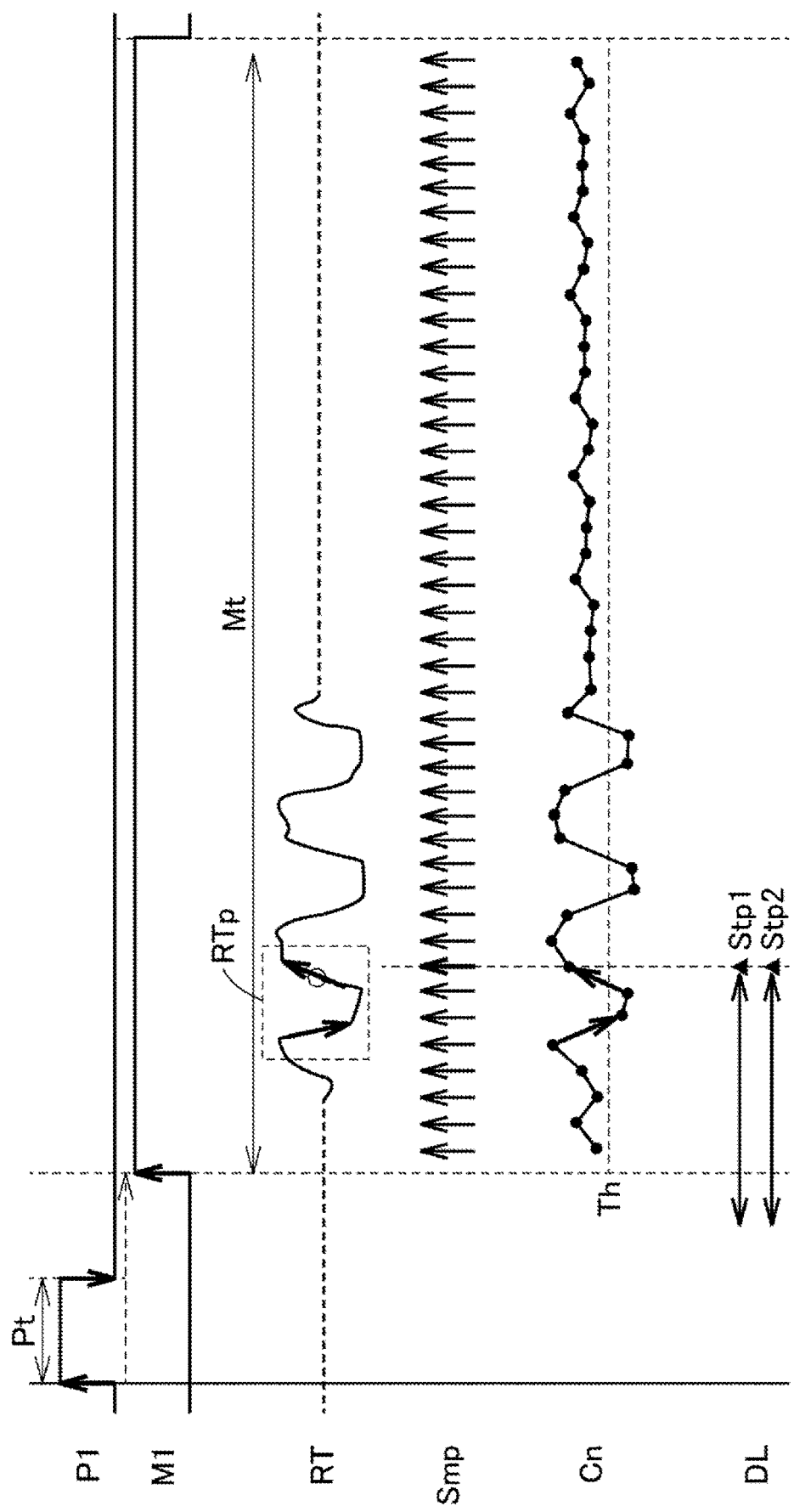
FIG. 6 is a timing diagram showing an overview of operations of the counter measurement unit 32 and its periphery according to the embodiment of the present invention.

FIG. 6 is a timing diagram showing an overview of the operation of the counter measurement unit 32 and its periphery according to the embodiment of the present invention.

In the embodiment of the present invention, first, the entire measurement range of the sensor device 1 is roughly measured by a counter method using a clock signal. The rough measurement is performed with a resolution of nanosecond order. After that, only the periphery of the measurement point estimated by the rough measurement is finely measured by the TDC delay line method. Specifically, by outputting a stop signal of the fine measurement near the measurement point searched by the rough measurement, the vicinity of the object can be measured with high precision. The fine measurement is performed with resolution of picosecond order.

The rough measurement and the fine measurement are described with reference to FIGS. 3 and 6.

<Rough Measurement>

First, the light projection element 14 emits a light projection pulse P1 of a pulse width Pt. A fixed period Mt after the emission of the light projection pulse P1 becomes a measurement section M1 of the light projection pulse P1.

The counter measurement unit 32 samples the binarized information of the light reception signal RT with the sampling signal Smp based on the clock signal in the measurement section M1. Since the binarized information is sampled on the basis of the clock signal, the binarized information is associated with time information. The light reception signal RT is obtained, for example, by inputting a signal from the light reception element 15 by a LVDS (Low Voltage Differential Signaling) method. A partial waveform RTp of the light reception signal RT is a reflected wave corresponding to the light projection pulse P1.

The counter integration signal Cn is obtained by measuring the binarized information of the light reception signal RT with the sampling signal Smp until a predetermined number of times of integration (n times) is reached, and integrating the binarized information n times for each clock. The counter measurement unit 32 recognizes, as a measurement point, a rising time point of the counter integration signal Cn that first intersects the determination threshold value Th, and outputs a stop signal at this time point. Moreover, the recognition of the measurement point is only an example, and the measurement point can also be recognized at other feature points such as the falling time point. In the rough measurement, a new waveform is searched from an old waveform in terms of time to fine a feature point of the light reception signal RT. Besides, in the rough measurement, it is also possible to search an old waveform from a new waveform in terms of time to find a feature point of the light reception signal RT.

<Fine Measurement>

The TDC delay line measurement unit 33 receives the stop signal obtained by the rough measurement, and performs fine measures only immediately before the stop signal. In the delay line measurement DL, the TDC delay lines 301, 302, ... receive the stop signals Stp1, Stp2, ... and perform the fine measurement only around the measurement point. By applying the stop timing of the fine measurement in the vicinity of the measurement point searched by the rough measurement, the vicinity of the workpiece 101 as the object can be measured with high precision. Therefore, unlike the related art, it is possible to improve the measurement precision of the distance to the object without increasing the circuit scale.

In the fine measurement, after the filter-processing is performed on the integration results of the binarized light reception signal acquired by the delay line, the old waveform is searched from the new waveform in terms of time. Thereby, a measurement point can be searched at a point with high signal level as much as possible, and the influence of noise such as external light can be suppressed as much as possible. Moreover, in the fine measurement, it is also possible to search a new waveform from an old waveform in terms of time. In addition, by acquiring the binarized light reception signals in parallel with n rows of delay lines, sampling can be performed n times at the same time as compared with the case of a single row.

In addition, by implementing the following processing together, it is possible to speed up the sensor response of the sensor device 1 and stabilize the measurement.

In the first measurement, the distance to the object can be measured using the results of the rough measurement and the fine measurement at the time of operation of the user. Thereby, the output response speed of the sensor device 1 can be accelerated.

In cases of measuring a workpiece flowing on a factory line, there may be a state in which a measurement object exists again after the measurement object disappears and an error of insufficient light amount occurs. In this case, the output response speed of the sensor device 1 can be accelerated by performing the fine measurement using the result of the previous rough measurement.

In addition, if the light amount becomes insufficient in the rough measurement, the fine measurement can be executed on the basis of the result of the previous rough measurement. Besides, the case in which the light amount becomes insufficient in the rough measurement is not regarded as a measurement error, and only the case of a fine measurement error is regarded as a measurement error.

In addition, an amplitude reference value of the integrated waveform for determining the light amount insufficiency in the rough measurement or the fine measurement can be determined based on the amplitude of the integrated waveform at the time of operation of the user.

Figure 7:
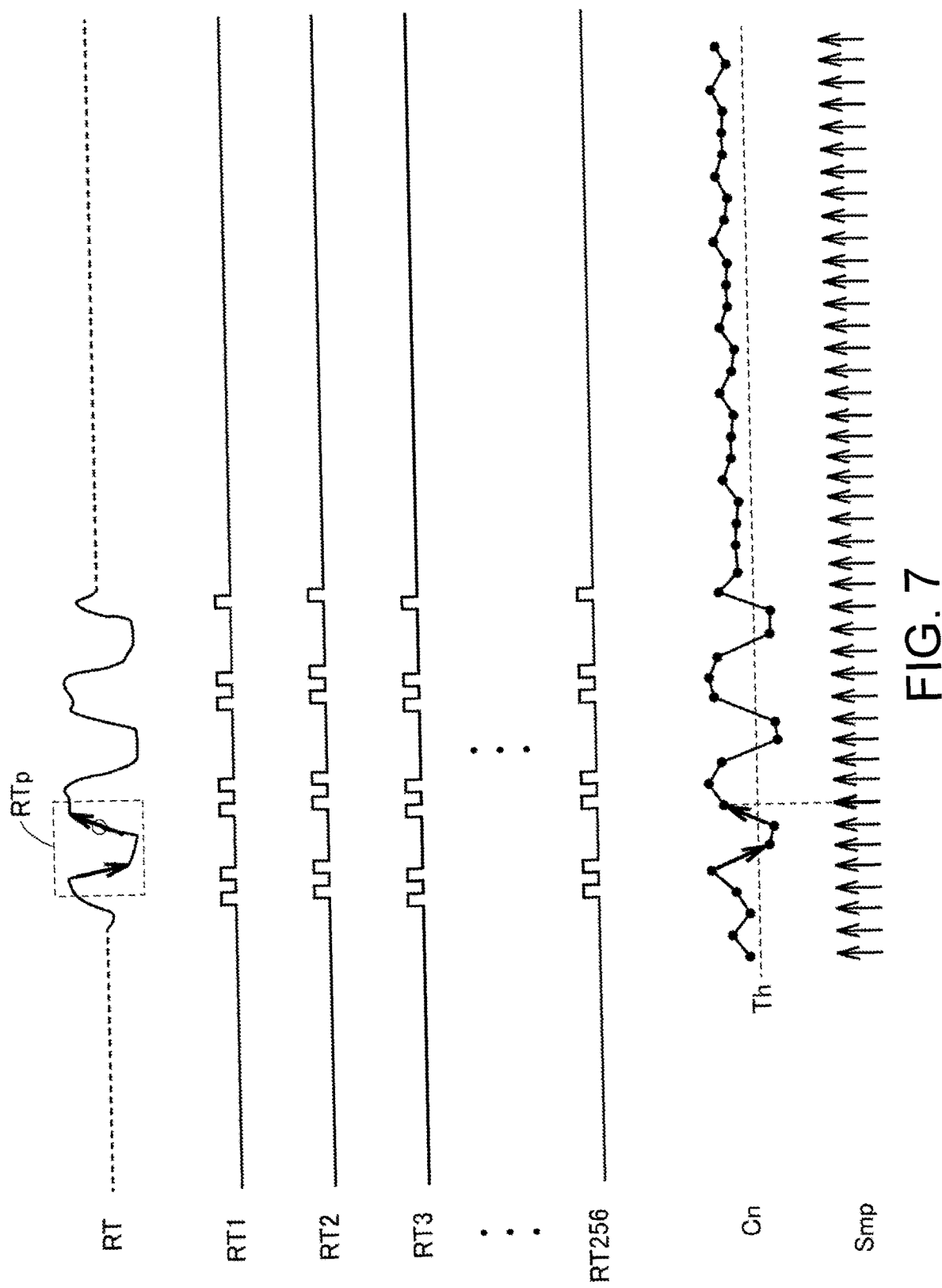
FIG. 7 is a timing diagram showing operation of a rough measurement of the counter measurement unit 32 according to the embodiment of the present invention.

FIG. 7 is a timing diagram showing the operation of the rough measurement of the counter measurement unit 32 according to the embodiment of the present invention.

Referring to FIGS. 5 and 7, the light reception signal capturing unit 321 captures the light reception signal RT on the basis of the timing of the start signal Str. The light reception signal RT corresponds to the waveform shown in FIG. 6. The light reception signal RT is binarized, and the light reception signals RT1, RT2, ..., RT256 (hereinafter also collectively referred to as "light reception signal RT") are sequentially captured into the light reception signal capturing unit 321 in accordance with the timing of the start signal Str. The counter integration signal Cn indicates the light reception signal RT accumulated in the signal accumulation unit 322, and corresponds to the waveform shown in FIG. 6.

The stop signal determination unit 323 outputs a sampling signal Smp based on the clock signal to the counter integration signal Cn. The stop signal determination unit 323 recognizes, as a measurement point, the rising time point of the counter integration signal Cn that first intersects the determination threshold value Th, and outputs the stop signal Stp at this time point. The determination threshold value Th is variably set depending on n times of the measurement cycle (256 times in FIG. 7) of the light reception signal RT. Although the determination threshold value Th is preferably set to ½ of n times of the measurement cycle of the light reception signal RT, it may not be ½. When the workpiece 101 is placed at a long distance from the sensor device 1 or when the reflectivity of the workpiece 101 is low, the determination threshold value Th is set to be larger than ½ of n times of the measurement cycle of the light reception signal RT. Thereby, the counter integration signal Cn can be detected with higher sensitivity.

Figure 8:
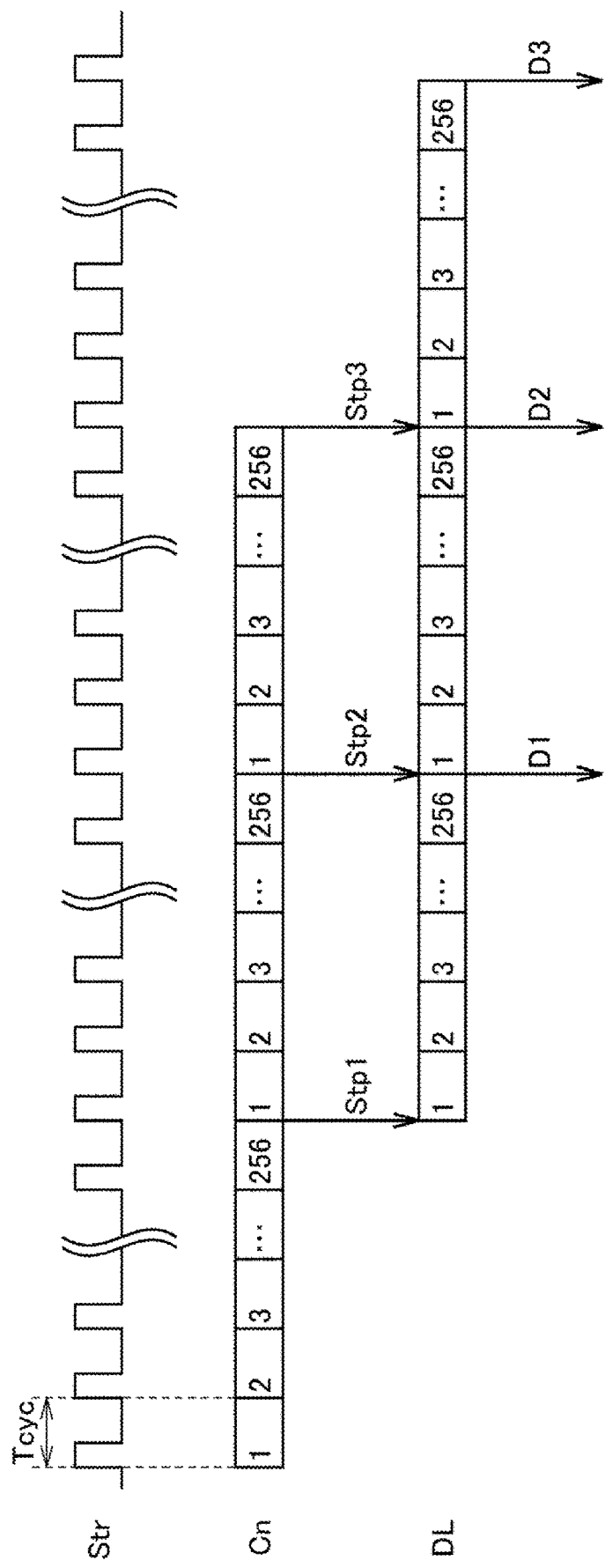
FIG. 8 is a timing diagram showing an overview of the operations of a TDC delay line measurement unit 33 and its periphery according to the embodiment of the present invention.

FIG. 8 is a timing diagram showing an overview of the operation of the TDC delay line measurement unit 33 and its periphery according to the embodiment of the present invention.

FIG. 8 shows an operation in the case where the number of times of counter measurement in the counter measurement unit 32 and the number of times of integration in the TDC delay line measurement unit 33 are the same (256 in FIG. 8, but it is changeable). Moreover, in order to shorten the response time in the counter measurement unit 32 or the TDC delay line measurement unit 33, it is also possible to shorten either number of times and perform the measurement. If the number of times of counter measurement and the number of times of integration are not the same, a waiting time occurs in the counter measurement or the delay line measurement, and thus the measurement efficiency may be lowered.

Referring to FIGS. 3 to 5 and 8, the start signal Str corresponding to the clock signal Ck output from the PLL 47 to each block of the FPGA 30 has, for example, a cycle Tcyc. In the counter integration signal Cn of the counter measurement unit 32, the binarized light reception signal RT is captured 256 times and integrated on the basis of the timing of the start signal Str. The stop signal determination unit 323 recognizes, as a measurement point, the rising time point of the integrated value of the light reception signal RT, which first intersects the determination threshold value Th for every clock cycle 256 times, and simultaneously outputs the stop signals Stp1, Stp2, and Stp3, . . . to the TDC delay lines 301, 302, 303, . . . at this time point.

In a delay signal group DL in the TDC delay line measurement unit 33, the first TDC delay line 301 outputs a delay line output signal D1a in synchronization with the stop signal Stp1. The buffer 315 outputs the delay line output signal D1 obtained by integrating the delay line output signal D1a 256 times in synchronization with the next stop signal Stp2, and receives the delay line output signal D2a. The buffer 315 outputs the delay line output signal D2 obtained by integrating the delay line output signal D2a 256 times in synchronization with the next stop signal Stp3, and receives the delay line output signal D3a. The same also applies to the subsequent delay line output signals D3, D4, . . . output from each of the TDC delay lines 303, 304, . . . .

In this way, by performing the TDC delay line measurement on the basis of the stop timing determined by the number of times of clock cycles, it is possible to obtain the time from the start of the light projection to the light reception measurement point. As described in FIG. 3, the delay line output signals D1, D2, D3, . . . are integrated by the waveform integration unit 34, and the distance to the workpiece 101 is measured via the filter processing unit 36, the step number calculation processing unit 37, and the distance conversion unit 38.

Figure 9:
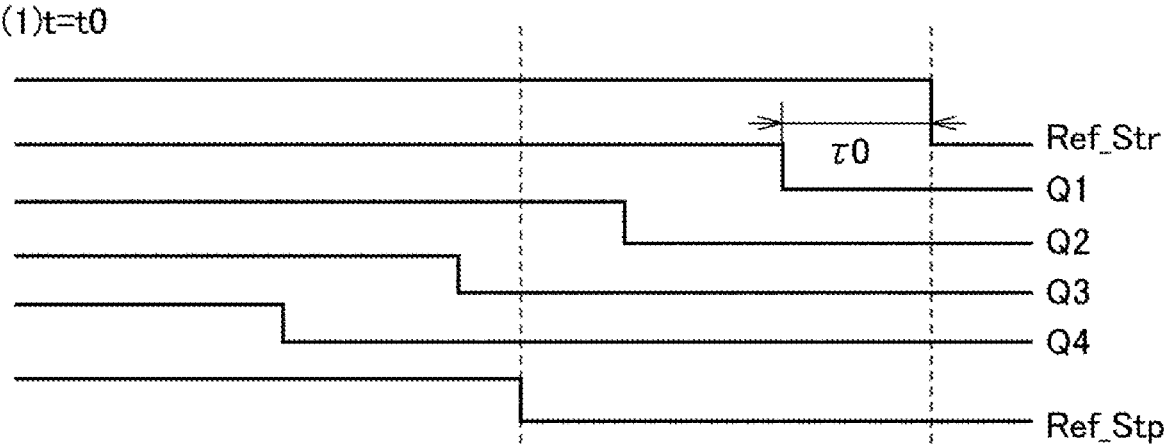
FIG. 9 is a waveform diagram showing a temperature correction operation of a delay element 6 of a temperature correction TDC delay line 310 according to the embodiment of the present invention.
Figure 9:
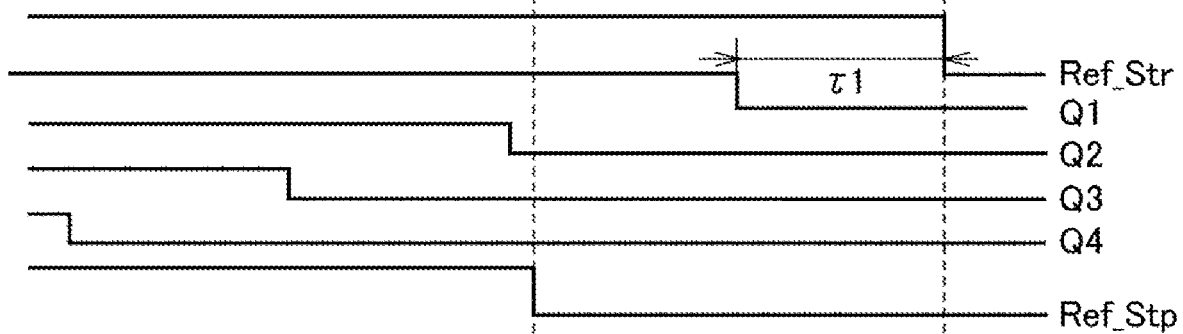
Figure 9:
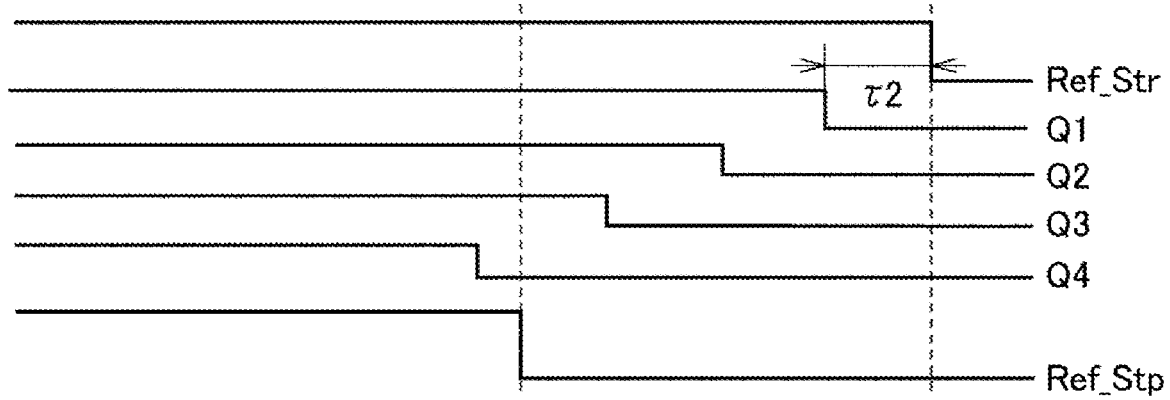

FIG. 9 is a waveform diagram showing the temperature correction operation of the delay element 6 of the temperature correction TDC delay line 310 according to the embodiment of the present invention.

Referring to (1) of FIG. 9, at the time of a standard temperature of the temperature t=t0 (e.g., 20° C.), the delay element 6 included in the temperature correction TDC delay line 310 has a delay width τ0. At this time, a delay signal Q1 rises with a delay width τ0 behind the reference start signal Ref_Str. A delay signal Q2 further rises with the delay width τ0 behind the delay signal Q1. The same also applies to the subsequent delay signals Q3 and Q4.

In (1) of FIG. 9, the reference stop signal Ref_Stp rises from the reference start signal Ref_Str after a fixed time. In (1) of FIG. 9, Q1=1, Q2=1, Q3=0, and Q4=0 are accumulated in the buffer 315, and the number of delay steps becomes 2. Since t=t0 is the standard temperature, the delay width τ0 of the delay element 6 at the reference clock time is known.

Referring to (2) of FIG. 9, at the time of the temperature t=t1 (e.g., 30° C.), the delay element 6 included in the temperature correction TDC delay line 310 has a delay width τ1. At this time, the delay signal Q1 rises with a delay width τ1 behind the reference start signal Ref_Str. The delay signal Q2 further rises with the delay width τ1 behind the delay signal Q1. The same also applies to the subsequent delay signals Q3 and Q4.

In (2) of FIG. 9, the reference stop signal Ref_Stp rises from the reference start signal Ref_Str after a fixed time. In (2) of FIG. 9, Q1=1, Q2=0, Q3=0, and Q4=0 are accumulated in the buffer 315. The number of delay steps (here, 1) can be obtained by measurement. The delay width τ1 can be obtained by calculation from the delay width τ0 of the delay element 6 of the reference clock time.

Referring to (3) of FIG. 9, at the time of the temperature t=t2 (e.g., 10° C.), the delay element 6 included in the temperature correction TDC delay line 310 has a delay width τ2. At this time, the delay signal Q1 rises with a delay width τ2 behind the reference start signal Ref_Str. The delay signal Q2 further rises with the delay width τ2 behind the delay signal Q1. The same also applies to the subsequent delay signals Q3 and Q4.

In (3) of FIG. 9, the reference stop signal Ref_Stp rises from the reference start signal Ref_Str after a fixed time. In (3) of FIG. 9, Q1=1, Q2=1, Q3=1, and Q4=0 are accumulated in the buffer 315. The number of delay steps (here, 3) can be obtained by measurement. The delay width τ2 can be obtained by calculation from the delay width τ0 of the delay element 6 of the reference clock time.

Referring to FIGS. 9 and 4, the temperature correction TDC delay line 310 combines the delay signals Q1, Q2, . . . , and outputs the temperature correction delay line output signal Dra (a=1 to m) independent of the light reception signal RT to the buffer 315. The buffer 315 outputs a temperature correction delay line output signal Dr obtained by integrating the temperature correction delay line output signal Dra m times.

Figure 10:
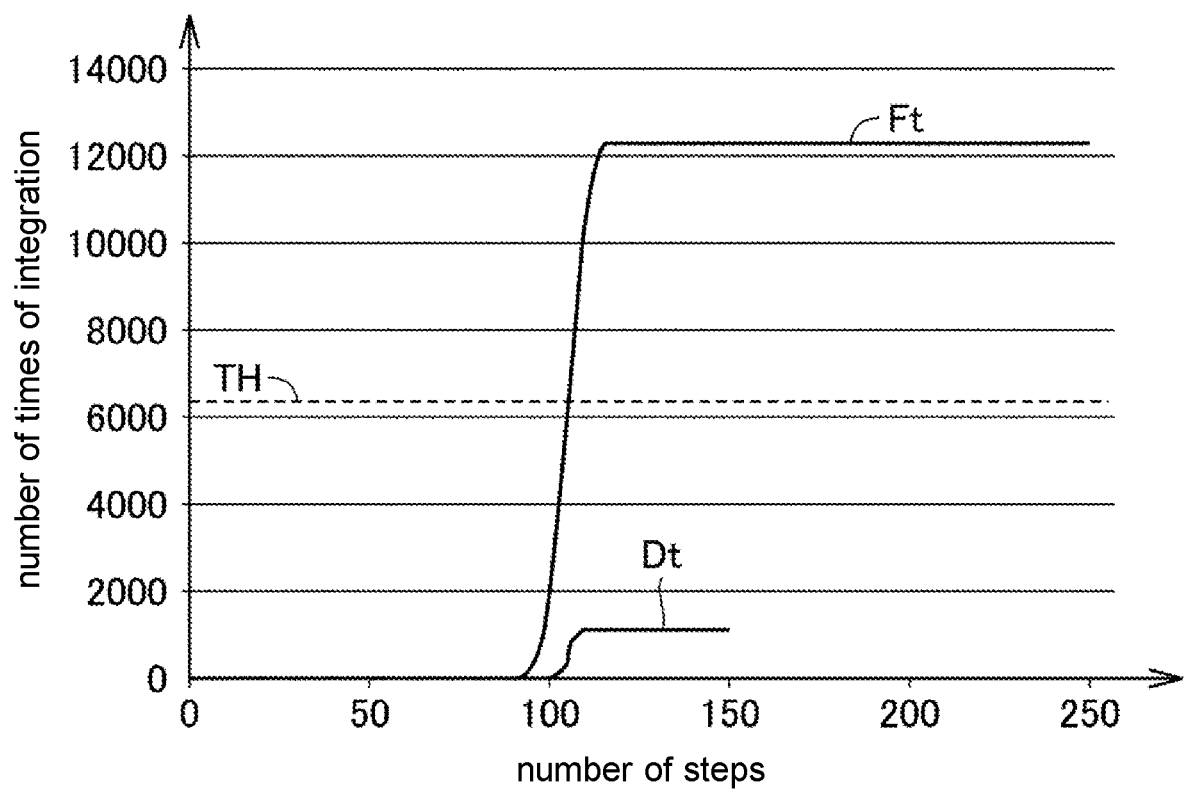
FIG. 10 is a waveform diagram showing processing results in a filter processing unit 36 and its periphery according to the embodiment of the present invention.

FIG. 10 is a waveform diagram showing a processing result in the filter processing unit 36 and its periphery according to the embodiment of the present invention.

Referring to FIG. 10, the integration signal Dt is an integration signal of all delay line output signals D1 to D4. The integration signal Dt is subjected to filter processing using a moving average to improve precision by noise reduction. The filter output signal Ft is a waveform after the integration signal Dt is weighted by a weighting coefficient Fd and is subjected to the filter processing. The moving average may be a simple moving average without weighting in addition to the above-described weighted moving average.

$$Fd = \pm 2^{\pm(n-1)}, n=1 \text{ to } 5$$

The value of n is set for each filter width. The filter width and the weighting coefficient Fd are set by the register 39. Referring to FIG. 3, the filter processing unit 36 receives the integration signal Dt and outputs the filter output signal Ft. The filter processing unit 36 calculates an average value of the neighboring area and is used as a smoothing filter. The step number calculation processing unit 37 calculates the number of steps of the delay element 6 on the basis of the time point when the light reception signal RT maximally changes from the intersection between the filter output signal Ft and the threshold value TH. The distance conversion unit 38 converts the number of steps of the delay element 6 into the distance to the object.

Figure 11:
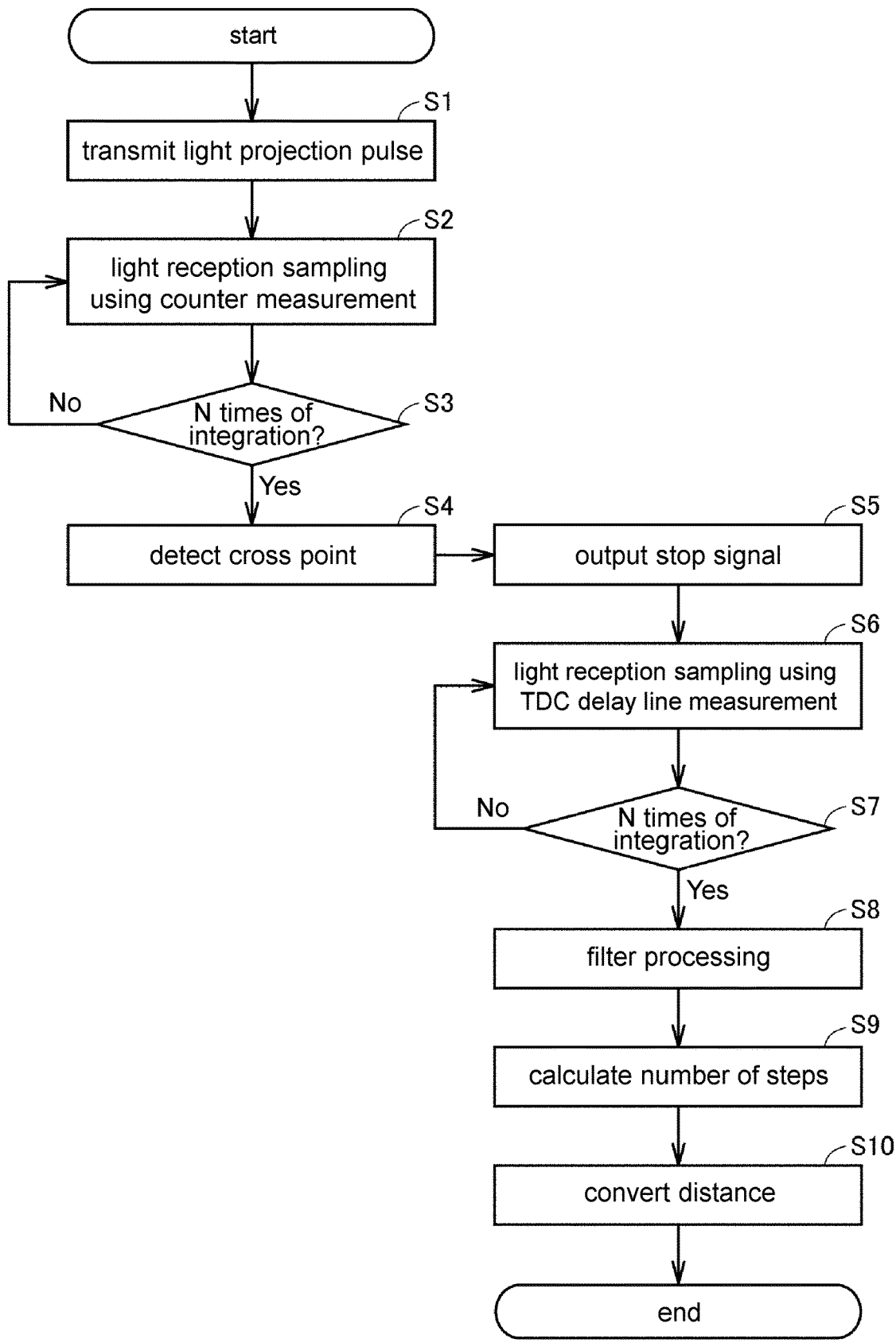
FIG. 11 is a flowchart showing a flow of distance calculation processing of the sensor device 1 according to the embodiment of the present invention for calculating a distance to an object.

FIG. 11 is a flowchart showing the flow of the distance calculation processing of the sensor device 1 according to the embodiment of the present invention for calculating the distance to the object.

FIG. 11 shows the flow of processing when the number of times of counter measurement in the counter measurement unit 32 is the same as the number of times of integration in the TDC delay line measurement unit 33. First, in step S1, a light projection pulse is transmitted from the light projection element 14 toward the object. In step S2, the counter measurement unit 32 samples the binarized information of the light reception signal RT. In step S3, it is determined whether the sampling is integrated N times. If the sampling is integrated N times in step S3, the processing proceeds to step S4, and if the sampling is not integrated N times in step S3, the processing returns to step S2 to continue the light reception sampling until the sampling is integrated N times.

In step S4, a cross point on which the counter integration signal Cn intersects the determination threshold value Th is detected. In step S5, a measurement point is recognized on the basis of the cross point, and a stop signal is output at this time point. In step S6, the binarized information of the light reception signal RT is sampled by the TDC delay line measurement unit 33. In step S7, it is determined whether the sampling is integrated M times. If the sampling is integrated M times in step S7, the processing proceeds to step S8, and if the sampling is not integrated M times in step S7, the processing returns to step S6 to continue the light reception sampling until the sampling is integrated M times.

In step S8, the filter processing unit 36 performs the filter processing on the integration signal Dt. In step S9, the number of steps of the delay element 6 at which the light reception signal RT maximally changes is calculated from the intersection between the filter output signal Ft and the threshold value TH. In step S10, the number of steps of the delay element 6 is converted into a distance to the object by the distance conversion unit 38.

As described above, in the embodiment of the present invention, the rough measurement of the entire range of the measurement range is performed by the counter method using the clock, and only the periphery of the measurement point estimated by the rough measurement is finely measured by the TDC delay line. Thereby, it is possible to improve the measurement precision of the distance to the object without increasing the circuit scale.

Specifically, the distance to the object can be detected over a long distance with high precision without increasing the resources of the FPGA or the ASIC. In addition, the number of rows of delay lines can be further increased depending on the package size of the FPGA or ASIC, and the object can be detected with higher precision.

When an ASIC in which the delay time is controllable is used in the sensor device 1, it is possible to input the light reception signal RT shifted by some times to the paralleled TDC delay line. Thereby, in the sensor device 1, it is possible to realize a resolution higher than the time resolution of one delay element.

In addition, by increasing the number of times of sampling at the same time by an increase in rows of the delay lines, it is possible to cope with high-speed output of the sensor device. For this reason, it is possible to obtain a system configuration corresponding to a wide range of applications. Furthermore, by using in combination with the counter measurement unit, variations caused by temperature can be suppressed as compared with the case of a configuration including only the delay lines.

Although light has been described as an example of the measurement medium of the sensor device in the embodiment of the present invention, an electromagnetic wave, a sound wave or the like may be substituted for light. When the electromagnetic wave or the sound wave is used as the measurement medium, it is possible to measure not only the distance to the object but also the distance change to the object.

The embodiment disclosed herein should be considered as illustrative rather than restrictive in all points. The scope of the present invention is shown not by the above description of the embodiments but by the scope of claims, and is intended to include meaning equivalent to the claims and all modifications within the scope.

What is claimed is:

1. A sensor device which measures a distance or a distance change to an object, the sensor device comprising:
   a light projection element and circuit configured to transmit a transmission signal toward the object;
   a light reception element and circuit configured to receive a received signal obtained by reflection of the transmission signal at the object and binarizes the received signal; and
   an application specific integrated circuit (ASIC) configured to:
   generate, on the basis of transmission timing of the transmission signal, a first waveform data obtained by sampling the received signal at a sampling cycle, and generate first integrated waveform data by integrating the first waveform data for multiple times of transmission by the light projection element and circuit;
   determine reference timing on the basis of a position of a first feature point appearing in the first integrated waveform data due to presence of the object, and generate a stop signal on the basis of the reference timing when the light projection element and circuit transmits the transmission signal;
   include a plurality of delay elements connected in series as at least one delay circuit, generate second waveform data by capturing the received signal from each of the delay elements in accordance with the generation of the stop signal, and generate second integrated waveform data by integrating the second waveform data by a predetermined clock cycle after determining the reference timing; and
   calculate the distance to the object, on the basis of a position of a second feature point which appears in the second integrated waveform data due to the presence of the object and on the basis of timing at which the stop signal is generated.

2. The sensor device according to claim 1, wherein the ASIC is configured to integrate the second integrated waveform data output from each of a plurality of delay circuits arranged in parallel, when there is the plurality of delay circuits.

3. The sensor device according to claim 1, wherein the ASIC is further configured to generate the first integrated waveform data by integrating the first waveform data for a first number of times,
   generate the stop signal on the basis of the reference timing for each of the first number of times, and
   generate the second integrated waveform data by integrating the second waveform data for a second number of times.

4. The sensor device according to claim 3, wherein in a case that the first number of times and the second number of times are the same, the efficiency of measurement is higher than in a case that the first number of times and the second number of times are different from each other.

5. The sensor device according to claim 1, wherein the ASIC is further configured to include a plurality of delay elements connected in series as a temperature correction circuit configured to:
   calculate a delay width at a current temperature on the basis of the delay width of the delay elements in a reference clock time, and
   correct the distance to the object on the basis of the delay width at the current temperature.

6. The sensor device according to claim 1, wherein the first feature point is a rising time point of the first integrated waveform data which first intersects a first threshold value, and the ASIC is configured to determine the first feature point by searching an intersection between the first integrated waveform data and the first threshold value from past to future or from future to past at the sampling cycle.

7. The sensor device according to claim 6, wherein the first threshold value is set to ½ of the number of times of integration of the first waveform data, and is changed from ½ depending on the distance between the object and the sensor device or the reflectivity of the object.

8. The sensor device according to claim 1, wherein the second feature point is an intersection between the second integrated waveform data and a second threshold value, and the ASIC is configured to search the second feature point of the second integrated waveform data toward the past or the future.

9. The sensor device according to claim 1, wherein the ASIC is configured to perform filter processing on the second integrated waveform data by a simple moving average or a weighted moving average, before calculating the distance to the object.

10. The sensor device according to claim 1, wherein the ASIC is configured to has a resolution on the nanosecond order, and has a resolution on the picosecond order.

11. A measurement method for measuring a distance or a distance change to an object, the method comprising:

transmitting a transmission signal toward the object;

receiving a received signal obtained by reflection of the transmission signal at the object and binarizing the received signal;

generating, on the basis of transmission timing of the transmission signal, a first waveform data obtained by sampling the received signal at a sampling cycle, and generating first integrated waveform data by integrating the first waveform data for multiple times of transmission;

determining reference timing on the basis of a position of a first feature point which appears in the first integrated waveform data due to presence of the object, and generating a stop signal based on the reference timing, when the transmission signal is transmitted;

generating second waveform data by capturing the received signal from each of a plurality of delay elements connected in series in accordance with the generation of the stop signal, and generating second integrated waveform data by integrating the second waveform data by a predetermined clock cycle after determining the reference timing; and calculating the distance to the object on the basis of a position of a second feature point which appears in the second integrated waveform data due to the presence of the object and on the basis of timing at which the stop signal is generated.

* * * * *